DELAY FLIP-FLOP CIRCUIT

Filed July 24, 1962 2 Sheets-Sheet 1

ROBERT N. MELLOTT
INVENTOR.

BY Samuel Lindenberg
ATTORNEY

Feb. 16, 1965 R. N. MELLOTT 3,170,075

DELAY FLIP-FLOP CIRCUIT

Filed July 24, 1962 2 Sheets-Sheet 2

ROBERT N. MELLOTT
INVENTOR.

BY Samuel Lindenberg
ATTORNEY 3,170,075
Patented Feb. 16, 1965

3,170,075

DELAY FLIP-FLOP CIRCUIT

Robert N. Mellott, Northridge, Calif., assignor, by mesne assignments, to The Bunker-Ramo Corporation, Stamford, Conn., a corporation of Delaware Filed July 24, 1962, Ser. No. 212,023
4 Claims. (Cl. 307—88.5)

This invention relates to bistable-state circuits of the type which are designated as flip-flop circuits and, more particularly, to improvements therein.

The circuit to which the appellation "flip-flop circuit" is applied usually is an arrangement of at least two tubes or transistors with a network cross-connecting these, so that, in response to an input signal, one of the tubes or transistors can be driven into conduction and the other cut off, and then, in response to another input signal, a reverse conduction and cutoff condition results. Alternatively, the two transistors or tubes may be biased so that they are driven from light conduction to heavy conduction alternatively in response to input signals. The speed with which these flip-flop interchange conduction states is usually determined by the time constants of the cross-coupling network, which serves as a limitation upon the speed of operation. Furthermore, if it is desired to operate the flip-flop in response to a clock as well as a driving signal, it is necessary to provide a logic circuit to take care of this situation.

The flip-flop circuit normally has two stable states and may be driven from one to the other by the input signals. An output is taken from one of the two stages to indicate the state of stability of the flip-flop circuit.

An object of this invention is to provide a bistable-state circuit which does not have a cross-coupling network.

Another object of this invention is to provide a bistable-state circuit which will operate in response to a triggering and clock signal, without requiring any external logic.

Still another object of the present invention is the provision of a novel and useful bistable-state circuit.

Yet another object of the present invention is the provision of a useful bistable-state circuit which can be employed as a delay flip-flop or as a basic shift-register stage.

These and other objects of the invention may be achieved in an arrangement wherein the bistable-state circuit comprises at least three transistors. These three transistors are interconnected so that in response to one type of input signal, designated as a false input signal, and a clock pulse, the first transistor of the three drives the third transistor into conduction, which, in turn, drives the second transistor into conduction. The second and third transistors thereafter maintain themselves in conduction.

Upon the application of a second type of signal, designated as a true signal, and a clock pulse to the first transistor, the first transistor is held biased off and further conduction in the second transistor is terminated, whereupon the third transistor is also biased off. If the second and third transistors were already in their cutoff condition when the true signal is applied, they will remain in that condition.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

The circuit in accordance with this invention is a bistable-state circuit which has a single input and a single output. The output has the same information pattern as the input, but occurs after a one-bit time delay. Thus, it provides an output representative of the input, one clock pulse later.

Figure 1:
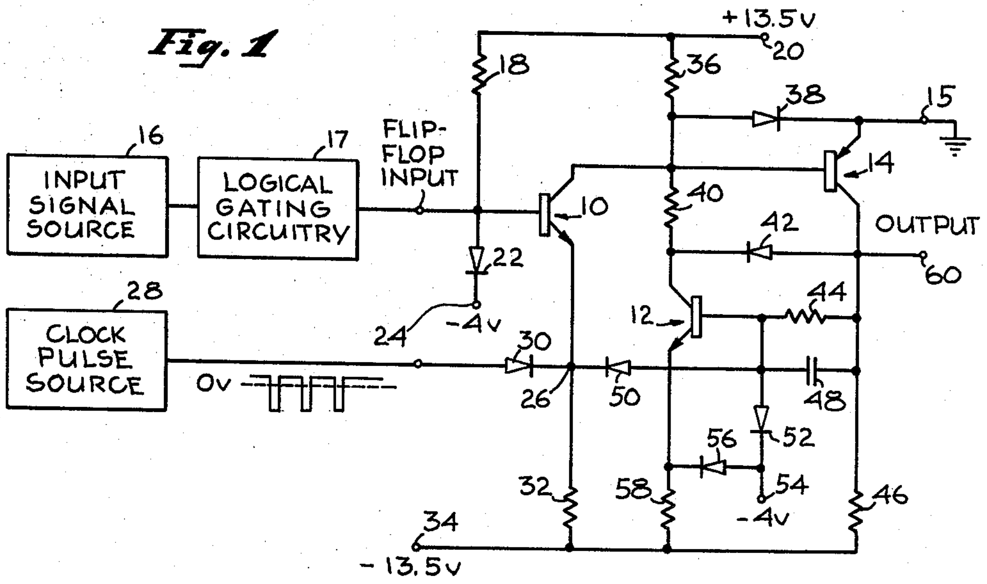
FIGURE 1 is a circuit diagram of an embodiment of the invention.

Reference is now made to FIGURE 1, wherein there may be seen a circuit diagram of an embodiment of this invention. This includes an input NPN type transistor 10, which is employed to alter the state of conduction of an NPN type transistor 12 and a PNP type transistor 14. An input-signal source 16 applies signals via any suitable logical gating circuit 17 to the base of transistor 10. The base of transistor 10 is biased by being connected through a resistor 18 to a terminal 20, to which a source of operating potential, designated as +13.5 volts is applied. The base of transistor 10 is also connected through a diode 22 to another terminal 24, to which a bias-potential source of −4 volts is applied.

The emitter of transistor 10 is connected to a junction 26, to which clock pulses from a source 28 may be applied through a diode 30. Also, a resistor 32 is connected from a terminal 34 to the junction 26. A negative operating-potential source on the order of −13.5 volts is applied to the terminal 34. The collector of transistor 10 is connected to the terminal 20 through a load resistor 36. The collector of transistor 10 is also directly connected to the base of the PNP transistor 14 and to the emitter of the transistor 14 through a diode 38. The emitter of transistor 14 is connected via a terminal 15 to ground.

The collector of NPN transistor 12 is connected through a resistor 40 in series with the resistor 36. The collector of transistor 12 is also connected to the collector of transistor 14 through a diode 42. The collector of transistor 14 is connected to the base of transistor 12 through a resistor 44. A load resistor 46 is connected from terminal 34 to the collector of transistor 14.

A capacitor 48 is connected in parallel with the resistor 44. A diode 50 is connected between the junction 26 and the base of transistor 12. The base of transistor 12 is connected through a diode 52 to a terminal 54, to which a source of bias potential, on the order of −4 volts, is connected. The emitter of transistor 12 is connected to a diode 56 to the terminal 54. The emitter of transistor 12 is also connected through a resistor 58 to the negative operating-potential terminal 34. The collector of transistor 14 is connected to an output terminal 60, from which output from the circuit is derived.

As stated previously, the circuit shown in FIGURE 1 has two stable states. Consider, first, conditions which arise when the transistor 14 is conducting. An output signal is derived from the output terminal 60, since current flows through the transistor and through resistor 46. Current also flows through resistor 44 to the base junction of transistor 12. At this point, current branches to supply base drive to transistor 12 and a current flows through the diode 52 to the −4 volt bias source connected to the terminal 54. Diode 52 is a silicon diode, preferably, and, since the forward drop thereacross is on the order of 0.5 to 0.7 volt, the base potential of transistor 12 is established between −3.5 to −3.3 volts. The emitter potential will be a few tenths of a volt more negative than the base potential. However, it will be more positive than a −4.0 volts. This means that diode 56 is cut off and that the current through the resistor 58 flows from the emitter of transistor 12. The value of resistor 58 is selected such that the collector current demanded by transistor 12 cannot be supplied through the resistor 36 without pulling the base of transistor 14 negative. Thus, the feedback loop is completed, and both transistors 12 and 14 are maintained in the conducting state. Resistor 40 and diode 42 limit the conducting condition of transistor 14.

Consider, now, the situation where transistor 14 is cut off. The collector of transistor 14 is at substantially −13.5 volts, and, accordingly, the base of transistor 12 is also at this potential, in view of the connection thereto of resistor 44. The emitter of transistor 12 is established at approximately −4.3 volts, due to the current flowing from the −4 volt source through terminal 54 through diode 56 and then through resistor 58 to the terminal 34. Transistor 12 is thus reverse-biased by the difference in the base and emitter voltages and is maintained nonconducting. With no collector current flowing in transistor 12, current flows from the terminal 20 through resistor 36 through diode 38 to ground, which results in a back-bias being applied between base and emitter of transistor 14 by the forward drop across diode 38. This keeps transistor 14 cut off.

In the interval between clock pulses, the emitter of transistor 10 is maintained at the clock-pulse reference potential, which is at approximately ground potential, by current flowing from the clock-pulse source 28 through diode 30 through resistor 32 to terminal 34. Current through resistor 18 and diode 22 to terminal 24 prevents the base of transistor 10 from being more than 0.3 to 0.5 volt above −4 volts, so that transistor 10 is cut off. Also, since the anode of diode 50 is at either −3.5 to −3.3 volts when current flows through diode 52, with which it is connected, or at −13.5 volts when transistor 14 is nonconducting, and since the cathode of diode 50 is at approximately clock reference potential, this diode is also cut off between clock pulses. Thus, with both transistor 10 and diode 50 nonconducting, the input circuit is essentially disconnected from, and cannot affect the status of, transistors 12 and 14.

Consider, now, the operation of the circuit at clock-pulse time. Assume, first, a false signal is applied from the input-signal source 16 to the logical gating circuitry 17 the output of which is connected to the base of transistor 10. A false signal essentially does not alter the potentials at the base of transistor 10 from the status just described. At clock-pulse time, a negative pulse of approximately six-volts peak is applied from the clock-pulse source 28 to the diode 30. As a result, diode 30 is no longer conductive, and the emitter of transistor 10 can swing negative from the potential applied at terminal 34. As a result, transistor 10 is rendered conductive, which applies base drive to transistor 14 for causing it to become conductive, if it was not already conductive. Transistor 14, in turn, through resistor 44 and capacitor 48 applies base drive to transistor 12, to render it conductive. Accordingly, the flip-flop circuit is triggered into its false state. If transistor 14 was already conducting at the time when transistor 10 is rendered conductive, then the base drive from transistor 10 only makes transistor 14 conduct the harder, and does not turn it off.

The application of a "true" signal from the input-signal source 16, through the logical gating circuitry to the base of transistor 10 is set at approximately −7 volts. At clock-pulse time, the emitter of transistor 10 is permitted to swing negative until diode 50 conducts, if transistor 12 is already conducting, or to −6 volts, if transistor 12 is cut off. Accordingly, transistor 10 remains reverse-biased. If transistor 12 were conducting, current through diode 50 and resistor 32 results in the application of a potential to the base of transistor 12, which causes it to become cut off. This, in turn, results in the application of a cut-off potential to the base of transistor 14. Thus, both transistors 12 and 14 go to their true conditions. If the transistors 12 and 14 were nonconducting at the time the true input was applied to the base of transistor 10, they would remain in their nonconducting state.

By way of illustration of an operative embodiment of the invention, the types of transistors and the values of the potential sources are provided. This is illustrative only and the invention should not be considered as limited thereto.

Figure 2:
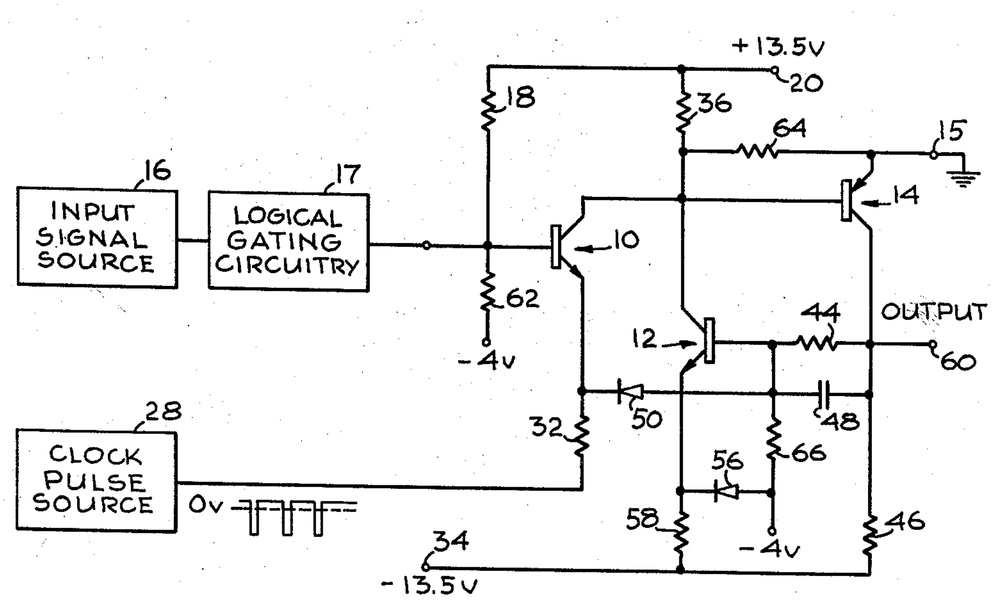
FIGURE 2 is a circuit diagram of another embodiment of the invention.

Reference is now made to FIGURE 2, which is a less expensive version of the embodiment of the invention shown in FIGURE 1. Structures which function similarly to those shown in FIGURE 1 bear the same reference numerals. The following changes are made in FIGURE 1 to obtain FIGURE 2. Diodes 30 and 42 are omitted, the resistor 40 is omitted, and a direct connection is made from the collector of transistor 12 to resistor 36. In place of diodes 22, 38, and 52, the respective resistors 62, 64, and 66 are inserted, which have their resistance values selected to provide the same type of voltage drop thereacross as occurs when current flows through these diodes. Finally, the resistor 32 is disconnected from the terminal 34 and instead is connected directly to the clock-pulse source 28.

The circuit shown in FIGURE 2 operates in substantially the same manner as the circuit shown in FIGURE 1. Upon the application of a false-input signal to the base of transistor 10, nothing happens until the next clock pulse. At this time, the emitter of transistor 10 is pulled negative with respect to its base, whereupon it is rendered conductive. This applies a drive to the base of transistor 14, to cause it to go conducting, if not already in the conducting state. When transistor 14 is rendered conductive, a signal is applied from its collector to the base of transistor 12, to drive transistor 12 into conduction. Upon the application of a true-input signal to the base of transistor 10, the succeeding clock pulse, while pulling the emitter down to substantially −6 volts, is not sufficiently negative to drive the transistor 10 into conduction. If transistor 12 is conducting, then the clock pulse causes diode 50 to become conductive, whereupon the potential applied to the base of transistor 12 is more negative than that existing at its emitter, and the transistor is cut off. When transistor 12 driven to cutoff, a cutoff potential is applied to the base of transistor 14, and it, too, is driven to cutoff. If transistor 12 were nonconducting at the time the clock pulse occurs, then a voltage of −13.5 volts exists at its base, and diode 50 remains non-conducting. Thus, transistor 12 and also transistor 14 remain nonconducting at this time.

Figure 3:
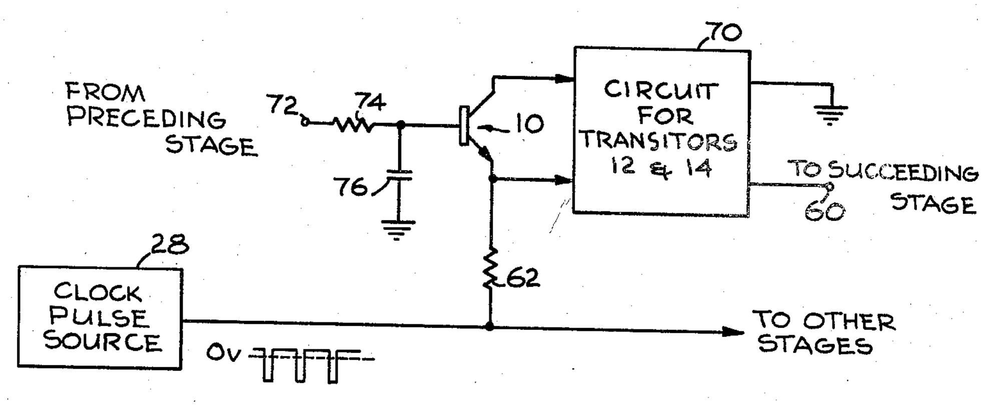
FIGURE 3 is a block circuit diagram showing the embodiment of the invention being used as a shift-register stage.

FIGURE 3 is a combined circuit and block diagram which shows how the circuit shown in either FIGURE 1 or FIGURE 2 may be used as a shift-register stage. The rectangle 70, which is called circuit for transistors 12 and 14, represents the circuitry shown in either FIGURE 1 or FIGURE 2, to which transistor 10 is connected. All that is necessary to make a shift register of a plurality of bits is to connect the output terminal 60 of one bit to the input terminal, here shown as 72, of the following bit of the shift register. The coupling network required between bits comprises a series resistor 74, connected between the input terminal 72 and the base of transistor 10 and a capacitor 76, which is connected between the base of the transistor and ground. The resistor 74 and capacitor 76 serve as a simple delay network between stages. If the transistors 10 and 12 of a preceding stage are conducting, then, upon the occurrence of a clock pulse, the succeeding-stage transistors 10 and 12 will be converted to a conducting condition, if not already so. If the transistors in the preceding stage are not conducting, then, upon the occurrence of a clock pulse, the transistors 10 and 12 of the succeeding stage are rendered nonconductive if not already so. The mechanics of the circuit operations, in response to the inputs and clock pulses, are identical with what has been described in connection with FIGURES 1 and 2.

Figure 4:
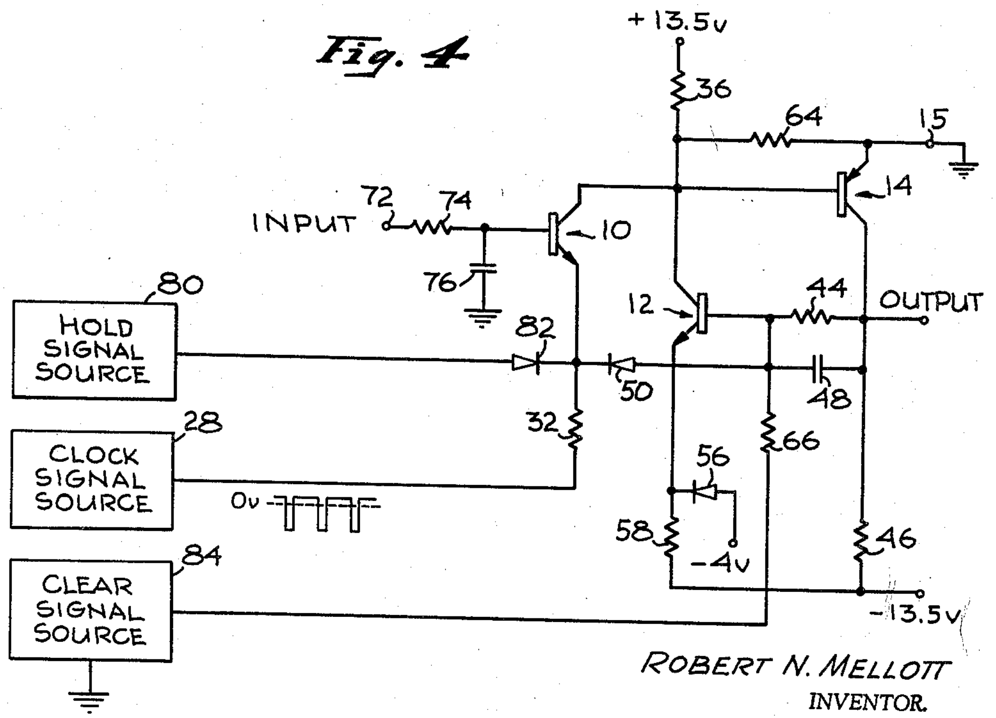
FIGURE 4 is a circuit diagram of a modification of FIGURE 3, showing how it may be employed with hold and clear signals being applied.

FIGURE 4 shows a circuit diagram of a shift-register stage in accordance with this invention which has "hold" and "clear" control features added thereto. FIGURE 4 is essentially the identical arrangement as FIGURE 3, except that hold signals are applied from a hold-signal source 80 to the emitter of transistor 10 through a diode 82. Further, resistor 66 is connected to a clear-signal source 84, instead of to the —4 volt bias source. The circuit components, which perform identically with those components shown in FIGURE 2, have the same reference numerals applied thereto. In operation, the circuit will have a false state with transistors 12 and 14 conducting and a true state with transistors 12 and 14 nonconducting. If a signal applied from the hold-signal source is more negative than the negative peak of the clock-pulse signal received from the clock-pulse signal source 28, and if the signal applied from the clear-signal source 84 is at —4 volts, then the circuit will operate as a delay element in a shift register. That is, its output will be true or false in accordance with the signal applied to the input terminal 72 upon the application of the next clock pulse.

If the clear signal received from the clear-signal source 84 remains at —4 volts, but the hold signal received from the hold-signal source is changed to ground potential, clock pulses are prevented from affecting the basic flip-flop circuit. Thus, the state of the flip-flop circuit remains the same as it was just prior to the application of the hold signal. The reason this is so is that the input signals applied to terminal 72 will serve either to apply —13.5 volts or a few volts below ground potential to the base of transistor 10. In either case, the emitter of transistor 10 is held clamped to substantially ground potential, and therefore the transistor will not be affected by any input signal. The cathode of diode 50 is clamped at substantially ground potential, and therefore clock pulses cannot get through to drive transistor 12 into conduction.

The transistors 12 and 14 can be forced to their false or conducting state by applying a signal from the clear-signal source 84, which is sufficiently positive to cause transistor 12 to become conductive. This means a voltage level which is slightly more positive than —4 volts, which is the voltage to which the emitter is clamped through diode 56 when transistor 12 is nonconductive. By making the clear signal from the clear-signal source 84 negative with respect to —4 volts, the basic flip-flop stage, consisting of transistors 12 and 14, can be forced to the true state, with these transistors being cut off. This occurs since, as previously explained, when a sufficiently negative signal is applied to the base of transistor 12, it is cut off and applies a cutoff signal through its collector to the base of transistor 14.

There has been accordingly described and shown herein a novel, useful, bistable-state circuit wherein no crossover network is required and wherein the output has the same information pattern as the input but with a one-bit time delay.

I claim:

1. A bistable-state circuit comprising first, second, and third transistors, said first and second transistor being of a type which is complementary to the third transistor type, all said transistors having base, emitter, and collector electrodes, first, second, and third terminals, means connecting said third transistor emitter to said second terminal, a first and second resistor connected in series and having a junction therebetween, means connecting said first and second resistors between said first terminal and said second transistor collector, a diode connected between said junction and said second terminal, a second diode connected between said second transistor collector and said third transistor collector, means connecting said first transistor collector to said junction, a third resistor connected between said first terminal and said first transistor base, a fourth resistor connected between said third transistor collector and said third terminal, a fifth resistor connected between said second transistor emitter and said third terminal, a third diode, a source of negative potential, means connecting said third diode between said source of negative potential and the base of said second transistor, a fourth diode, means connecting said fourth diode between said negative potential source and the emitter of said second transistor, a fifth diode, means connecting said fifth diode between the base of said second transistor and the emitter of said first transistor, a sixth resistor connected between said first transistor emitter and said third terminal, a sixth diode connected between said first transistor base and said source of negative potential, a clock-pulse input terminal, a seventh diode connected between said clock-pulse input terminal and said first transistor emitter, an eighth resistor connected between said third transistor base and said second transistor collector, means for applying a positive operating potential between said first and second terminals, means for applying a negative operating potential between said third and second terminals, means for applying input signals and clock pulses to said first transistor base and to said clock-pulse terminal respectively, to determine the state of conduction of said first, second, and third transistors, and means for deriving an output from said third transistor collector indicative of the state of conduction of said third transistor.

2. A bistable-state circuit comprising first, second, and third transistors, said first and second transistors being of a type which is complementary to the third transistor type, all said transistors having base, emitter, and collector electrodes, first, second, and third operating-potential terminals, a first resistor connected between said first terminal and the collector of said second transistor, a second resistor connected between said second transistor collector and the emitter of said third transistor, means connecting said third transistor emitter to said second terminal, means connecting said third transistor base to said second transistor collector, means connecting said first transistor collector to said second transistor collector, a third resistor connected between said second transistor base and said third transistor collector, a capacitor connected in parallel with said third resistor, a first diode connected between said first transistor emitter and said second transistor base, a source of negative potential, a fourth resistor connected between said source of negative potential and said second transistor base, a second diode connected between said source of negative potential and said second transistor emitter, a fifth resistor connected between said third transistor collector and said third terminal, a sixth resistor connected between said second transistor emitter and said third terminal, a sixth resistor connected between said first terminal and said first transistor base, a sixth resistor connected between said first transistor base and said source of negative potential, a clock-pulse input terminal, a ninth resistor connected between said clock-pulse input terminal and the emitter of said first transistor, means for applying input signals to said first transistor base, means for applying clock-pulse signals to said clock-pulse terminal, to determine together with said input signals the state of conduction of said first, second, and third transistors, means for applying positive operating potential between said first and second terminals, means for applying negative operating potential between said third and second terminals, and means for deriving an output representative of the state of conduction of said third transistor from said third transistor collector.

3. In combination with a flip-flop circuit including first and second complementary type transistors, each having an emitter, a collector, and a base and wherein first means are provided coupling the collector of said first transistor to the base of said second transistor for rendering said second transistor nonconductive when said first transistor is nonconductive and wherein second means are provided coupling the collector of said second transistor to the base of said first transistor for rendering said first transistor conductive when said second transistor is conductive and wherein third means are provided respectively, coupling said first and second transistor emitters to sources of reference potential, an input circuit for respectively controlling said first and second transistors, said input circuit comprising:

input signal source means capable of selectively providing first and second output signals;

clock pulse source means for periodically providing clock pulses;

a third transistor having an emitter, a collector, and a base;

means applying said input signal source means output signal to said third transistor base and said clock pulses to said third transistor emitter;

said third transistor being rendered conductive in response to said first output signal and one of said clock pulses;

means connecting said third transistor emitter to said first transistor base for rendering said first transistor nonconductive in response to one of said clock pulses when said third transistor is nonconductive; and means connecting said third transistor collector to said second transistor base for rendering said second transistor conductive in response to one of said clock pulses when said third transistor is conductive.

4. In combination with a flip-flop circuit including first and second complementary type transistors, each having an emitter, a collector, and a base and wherein first means are provided coupling the collector of said first transistor to the base of said second transistor for rendering said second transistor nonconductive when said first transistor is nonconductive and wherein second means are provided coupling the collector of said second transistor to the base of said first transistor for rendering said first transistor conductive when said second transistor is conductive and wherein third means are provided respectively coupling said first and second transistor emitters to sources of reference potential, an input circuit for respectively controlling said first and second transistors, said input circuit comprising:

input signal source means capable of providing first and second output signals;

clock pulse source means for periodically providing clock pulses;

a third transistor having an emitter, a collector, and a base;

means applying said clock pulses to said first transistor base for normally rendering said first transistor nonconductive;

means applying said input signal source means output signal and said clock pulses to said third transistor base and emitter respectively for rendering said third transistor conductive in response to said first output signal and one of said clock pulses; and means responsive to said third transistor conducting for rendering said second transistor conductive to thus inhibit said clock pulse from rendering said first transistor nonconductive.

References Cited by the Examiner

UNITED STATES PATENTS

| | | | |
|---|---|---|---|
| 2,994,002 | 7/61 | Cooke-Yarborough | 307—88.5 |
| 3,002,109 | 9/61 | Baird | 307—88.5 |
| 3,008,056 | 11/61 | Wanlass | 307—88.5 |

JOHN W. HUCKERT, *Primary Examiner.*

ARTHUR GAUSS, *Examiner.*